United States Patent
Schibalsky

[11] Patent Number: 5,377,643
[45] Date of Patent: Jan. 3, 1995

[54] CYLINDER HEAD SEALING DEVICE FOR AN INTERNAL COMBUSTION ENGINE

[75] Inventor: Walter Schibalsky, Nürnberg, Germany

[73] Assignee: Man Nutzfahrzeuge AG, München, Germany

[21] Appl. No.: 48,834

[22] Filed: Apr. 16, 1993

[30] Foreign Application Priority Data

Apr. 24, 1992 [DE] Germany .............. 4213502

[51] Int. Cl.⁶ .............................. F16J 15/08
[52] U.S. Cl. .............. 123/193.3; 277/235 B; 277/236
[58] Field of Search ............ 123/393.3, 193.2; 277/235 B, 236, 180

[56] References Cited

U.S. PATENT DOCUMENTS

| | | | |
|---|---|---|---|
| 1,825,769 | 10/1931 | Barbarou | 123/193.3 |
| 2,939,753 | 6/1960 | Schilling et al. | 123/193.3 |
| 3,139,009 | 6/1964 | Harting | 123/193.3 |
| 3,432,177 | 3/1969 | Colwell | 277/236 |
| 4,312,512 | 1/1982 | Conte et al. | 277/236 |

Primary Examiner—David A. Okonsky
Assistant Examiner—M. Macy
Attorney, Agent, or Firm—Robert W. Becker & Associates

[57] ABSTRACT

A cylinder head sealing device for an internal combustion engine has a cylindrical gasket ring which has a relatively small wall thickness. This gasket ring engages on the one hand an annular groove within the cylinder head which is coaxially arranged relative to the cylinder axis. On the other hand, it engages a recess at the end of the cylinder liner. The annular groove is dimensioned such that during tightening of the cylinder head screws a radial as well as an axial play remains between annular groove and gasket ring. The sealing action is achieved such that the gasket ring which has relatively thin walls relative to its height is expanded by the gas pressure within the cylinder and pressed with its outer cylindrical wall against the recess of the cylinder liner thus leading to a sealing effect. The sealing effect is thus a function of the gas pressure. The sealing with respect to cooling water is achieved by an auxiliary areal seal which is prestressed by the cylinder head screws.

7 Claims, 2 Drawing Sheets

CYLINDER HEAD SEALING DEVICE FOR AN INTERNAL COMBUSTION ENGINE

BACKGROUND OF THE INVENTION

The present invention relates to a cylinder head sealing device for an internal combustion engine in which a gasket is arranged between the cylinder head and the cylinder liner and the gasket is surrounded by an auxiliary areal seal which is prestressed by fastening the cylinder head with cylinder screws between the cylinder head and a flange of the cylinder liner.

Cylinder head gaskets are commonly comprised of a relatively soft material and are inserted between the cylinder or the cylinder liner on the one hand and the cylinder head on the other hand. They are clamped therebetween by cylinder head screws until a plastic deformation of the cylinder head gasket occurs and the material of the gasket conforms to the uneven surface of the cylinder head thereby producing a gas-tight connection. However, due to non-uniform fastening of the cylinder head screws and plastic flow of the gasket material such sealing devices often lose their sealing effect. Furthermore, it is required that the cylinder head screws are tightened so strongly that undesired deformations within the cylinder head, respectively, within the cylinder block occur.

It is therefore an object of the present invention to provide a cylinder head sealing device of the aforementioned kind which is able to provide a reliable long-term uniform sealing effect without requiring high prestress of the cylinder head screws even under very high inner cylinder pressures.

BRIEF DESCRIPTION OF THE DRAWINGS

This object, and other objects and advantages of the present invention, will appear more clearly from the following specification in conjunction with the accompanying drawings, in which.

SUMMARY OF THE INVENTION

Figure 1:
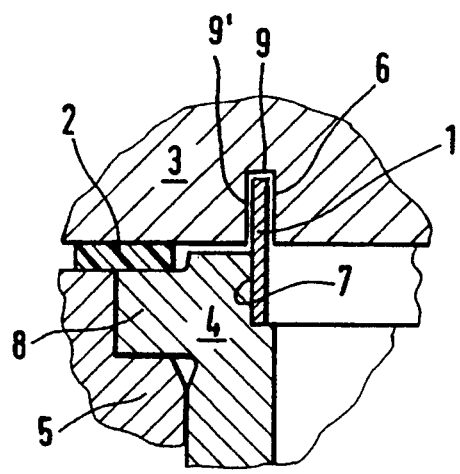
FIG. 1 shows a gasket inserted into the cylinder head.

The cylinder head sealing device positioned between a cylinder head and a cylinder liner of an internal combustion engine according to the present invention is primarily characterized by:

A cylindrical gasket ring having a first and a second end and being coaxially positioned relative to the axis of the cylinder, the gasket ring having a width and a height, with the width being small compared to the height, the gasket ring positioned with the first end in an annular groove of the cylinder head and with the second end connected to the cylinder liner; and An auxiliary areal sealing positioned radially outwardly of the gasket ring between the cylinder head and a flange of the cylinder liner and surrounding the gasket ring, the auxiliary areal sealing being prestressed by fastening the cylinder head.

Preferably, the cylinder liner has an inner wall with a recess in the area of the flange, the recess being shaped so as to conform to an outer contour of the second end of the gasket ring.

Preferably, the annular groove has a bottom, and the first end of the gasket ring positioned in the annular groove has minimal radial play in the annular groove, and when the cylinder head is fastened, has axial play relative to the bottom of the annular groove.

In a further embodiment of the present invention, the gasket ring has an outer cylindrical wall and an inner cylindrical wall, the outer cylindrical wall being shrink-fitted into the annular groove and the inner cylindrical wall being positioned with radial play relative to the annular groove;

The first end has a greater width than the second end; and

Between the recess and the gasket ring an axial play is present after the cylinder head has been fastened.

Preferably, the first end has a frusto-conical cross-section and the annular groove has a corresponding frusto-conical cross-section, and the second end has a greater width than the first end.

In another embodiment of the present invention, the gasket ring is a unitary part of the cylinder liner. The cylinder liner has a cylinder bore, and the gasket ring has a cylindrical inner wall having a continuous transition into the cylinder bore. The annular groove has a bottom and the first end of the gasket ring positioned in the annular groove has an axial play relative to the bottom of the annular groove, when the cylinder head is fastened.

Preferably, the gasket ring has an outer cylindrical wall with circumferential grooves.

Due to the form-locking (form-fitting) of the cylindrical gasket ring within the cylinder head and due to the pressing of the gasket ring into the recess of the cylinder liner under the effect of the gas pressure within the cylinder, a reliable sealing without axial prestress caused by the cylinder head screws upon fastening of the cylinder head to the cylinder block is achieved.

The insertion of the gasket ring into the annular groove provides form-locking (gasket ring and annular groove have matching contours or forms so that insertion provides a perfect, tight fit or locking) and sealing in this area, while at the same time the gasket ring is pressed by the pressure of the gas within the cylinder against the recess of the cylinder liner creating a self-sealing effect.

When the gasket ring is shrink-fitted into the cylinder head a sealing between the gasket ring and the cylinder head is achieved without prestress caused by the cylinder head screws. The sealing effect between gasket ring and cylinder liner is achieved by the pressure of the gas within the cylinder which presses the gasket ring into the recess.

An improvement of the form-locking between the annular groove of the cylinder head and the gasket ring can be achieved by a frusto-conical cross-sectional embodiment of annular groove and gasket ring which results in an improvement of the form-locking and thus in additional protection against penetration of combustion gases through the sealing.

In a preferred embodiment of the present invention the gasket ring is an integral part of the cylinder liner, i.e., gasket ring and cylinder liner are a unitary part. By providing such a unitary part encompassing the gasket ring and the cylinder liner complete tightness is ensured.

When the outer cylindrical wall of the gasket ring is provided with circumferential grooves, the areal pressure is increased and the sealing effect is improved accordingly.

DESCRIPTION OF THE PREFERRED EMBODIMENTS

The present invention will now be described in detail with the aid of several specific embodiments utilizing FIGS. 1 through 5.

According to FIG. 1 the inventive cylinder head sealing device is comprised of a cylindrical gasket ring 1 and a conventional auxiliary areal seal 2. The auxiliary areal seal 2 is prestressed between a cylinder head 3 and a cylinder liner 4 by non-represented cylinder head screws. The cylinder liner 4 is mounted within a cylinder block 5. The cylindrical gasket ring 1, on the one hand, is inserted with its first end into an annular groove 6 which is concentric to the cylinder axis, and, on the other hand, is supported with its outer cylindrical wall of the second end at a recess 7 of a flange 8 of the cylinder liner 4. When loaded by the inner pressure of the gas present within the cylinder the second end of the gasket ring 1 is forced against the recess 7, so that this area is self-sealing. With respect to the annular groove 6 the first end of the gasket ring 1 has only minimal play to the sidewall 9' so that in this area sufficient sealing is also achieved. Upon insertion of the gasket ring 1 into the annular groove 6, the gasket ring 1 has play relative to the bottom 9 of the groove 6 so that no axial forces act on the gasket ring 1. The gasket ring 1 therefore can be embodied such as to be relatively thin with respect to its height. Due to the reduced thickness of the gasket ring 1 it experiences a radial expansion when exposed to gas pressure and is thus pressed with its outer cylindrical wall against sidewall 9' of the groove 6 of the the cylinder head 3 and the recess 7 which results in a self-sealing action.

Figure 2:
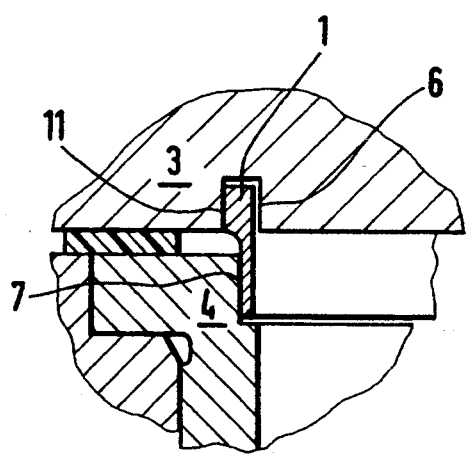
FIG. 2 shows a gasket which is shrink-fitted with one side into the cylinder head.

FIG. 2 shows a variant of the gasket ring 1. The outer cylindrical wall 11 of the first end of the gasket ring 1 is shrink-fitted within the area of the annular groove 6 of the cylinder head 3 such that in addition to the form-fitting effect also a force-locking is achieved. In the area of the cylinder liner 4 the second end of the gasket ring 1 is again supported at the recess 7 with its outer cylindrical wall. The shrink-fitting connection within the area of the annular groove 6 results in a complete gas-tightness. In the assembled state, the second end of the gasket ring 1 is provided with axial play relative to the cylinder liner 4.

Figure 3:
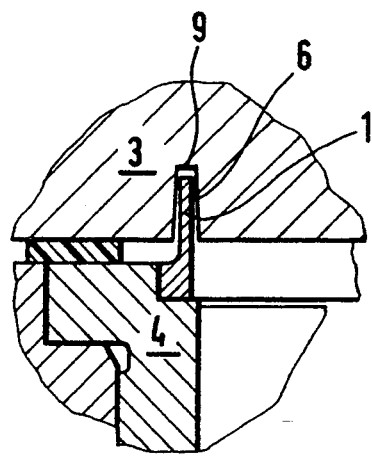
FIG. 3 shows a gasket with a frusto-conical cross-section within the cylinder head.

A further embodiment is shown in FIG. 3. The first end of the gasket ring 1 has a frusto-conical cross-sectional shape and is inserted into the annular groove 6 of the cylinder head 3 also having a frusto-conical cross-sectional shape. When inserting the gasket ring 1, especially during tightening of the cylinder head screws, the ring 1 is wedged into the annular groove 6. This arrangement results in a completely gas-tight sealing action. At the bottom 9 of the annular grooves 6 play is provided in order to allow in any case a contact of the gasket ring 1 at the sidewalls of the annular groove 6.

Figure 4:
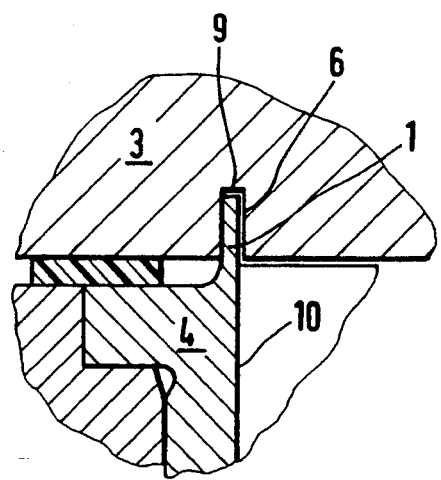
FIG. 4 shows a gasket that is a unitary part of the cylinder liner and is inserted into the cylinder head.

In the embodiment according to FIG. 4 the gasket ring 1 is an integral (unitary) component of the cylinder liner 4 whereby the inner cylindrical wall of the gasket ring 1 has a continuous transition into the cylinder bore 10 of the cylinder liner 4. The gasket ring 1 of the cylinder liner 4 is inserted into the annular groove 6 of the cylinder head 3 and the gasket ring 1, in the assembled state, has play relative to the bottom 9 of the annular groove 6.

A common feature of the embodiments of FIGS. 1, 2, 4 is that they do not require any prestress applied by the cylinder head screws, with the exception of the auxiliary areal seal 2. Only the embodiment according to FIG. 3 provides a slight prestress in the axial direction when tightening the cylinder head screws so that the frusto-conically shaped gasket ring 1 is pressed against the sidewalls of the annular groove 6. Due to the slight prestress of the cylinder head screws a deformation of the cylinder block 5, respectively, of the cylinder head 3 is prevented. Furthermore, the sealing effect is not adversely affected when the prestress of the cylinder head screws is slowly reduced over time. Accordingly, a retightening of the cylinder head screws is not required.

Figure 5:
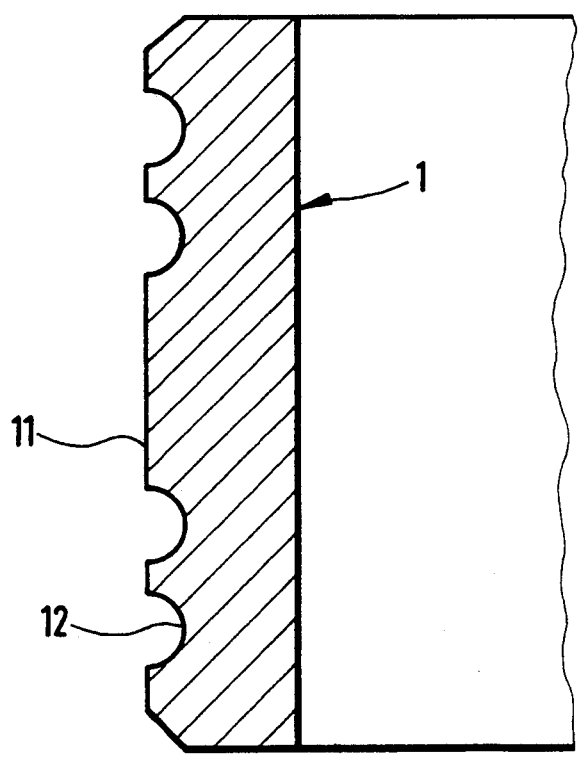
FIG. 5 shows a cross-sectional view of the gasket ring with circumferential grooves.

FIG. 5 shows a cross-section through a cylindrical gasket ring 1. The outer cylindrical wall 11 is provided with circumferential grooves 12. These circumferential grooves 12 reduce the surface area resulting in an increase of the areal pressure and the flexibility of the gasket ring. The gas pressure acting on the inner cylindrical wall of the gasket ring 1 forces the ring with its outer cylindrical wall 11 against the recess 7 of the cylinder liner 4, as can be seen in FIGS. 1 and 2, and thus improves the sealing action.

These circumferential grooves can also be employed in the embodiment according to FIG. 4.

The present invention is, of course, in no way restricted to the specific disclosure of the specification and drawings, but also encompasses any modifications within the scope of the appended claims.

What is claimed is:

1. A cylinder head sealing device positioned between a cylinder head and a cylinder liner of an internal combustion engine, said cylinder head sealing device comprising:

a cylindrical gasket ring having a first and a second end and being coaxially positioned relative to the axis of the cylinder, said gasket ring having a width and a height, with said width being small compared to said height, said gasket ring positioned with said first end in an annular groove of said cylinder head and with said second end connected to said cylinder liner; and an auxiliary areal seal positioned radially outwardly of said gasket ring between said cylinder head and a flange of said cylinder liner and surrounding said gasket ring, said auxiliary areal seal being prestressed by screws fastening said cylinder head to a cylinder block.

2. A cylinder head sealing device according to claim 1, wherein said cylinder liner has an inner wall with a recess in the area of said flange, said recess being shaped so as to conform to an outer contour of said second end of said gasket ring.

3. A cylinder head sealing device according to claim 2, wherein:

said annular groove has a bottom;

said first end of said gasket ring positioned in said annular groove has minimal radial play in said annular groove; and, when said cylinder head is fastened, said first end has axial play relative to said bottom of said annular groove.

4. A cylinder head sealing device according to claim 2, wherein:
said gasket ring has an outer cylindrical wall and an inner cylindrical wall, said outer cylindrical wall being shrink-fitted into said annular groove and said inner cylindrical wall being positioned with radial play relative to said annular groove;
said first end has a greater width than said second end; and
between said recess and said gasket ring an axial play is present after said cylinder head has been fastened.

5. A cylinder head sealing device according to claim 2, wherein:
said first end has a frusto-conical cross-section and said annular groove has a corresponding frusto-conical cross-section; and
said second end has a greater width than said first end.

6. A cylinder head sealing device according to claim 1, wherein:
said gasket ring is a unitary part of said cylinder liner;
said cylinder liner has a cylinder bore;
said gasket ring has a cylindrical inner wall having a continuous transition into said cylinder bore;
said annular groove has a bottom; and
said first end of said gasket ring positioned in said annular groove has an axial play relative to said bottom of said annular groove, when the cylinder head is fastened.

7. A cylinder head sealing device according to claim 1, wherein said gasket ring has an outer cylindrical wall with circumferential grooves.

* * * * *